United States Patent Office 3,280,053
Patented Oct. 18, 1966

3,280,053
POLYAMIDE STABILIZED WITH A COPPER
COMPOUND AND A STANNOUS SALT
Ian C. Twilley, Petersburg, Va., and Frederick P. Poznick,
Nabnasset, Mass., assignors to Allied Chemical Corporation, New York, N.Y., a corporation of New York
No Drawing. Filed June 17, 1963, Ser. No. 288,552
3 Claims. (Cl. 260—18)

This invention relates to heat stabilized ε-polycaproamide, more particularly such polycaproamide having low content of water extractible constituents of not over 5% by weight and stabilized against heat by incorporation therein of copper, especially in the form of a copper compound soluble in molten ε-caprolactam monomer.

It has been recognized that copper compounds impart stability against heat to polyamides when used in small amounts such as 0.001% to 0.03% by weight of the polyamide; however even in these small amounts copper compounds tend to impart a coloration to the polyamide and tend to induce degradation of the polyamide upon bleaching.

It has moreover been proposed to improve the heat stability imparted to polyamides by copper compounds by including both copper compounds and small amounts of further additives such as phosphorus compounds, alkali metal or alkaline earth metal halides, and hydrohalides of organic bases in the polymerization reaction mixture. Use of these further additives is not, however, entirely satisfactory when the polyamide is specifically polycaproamide. One reason for this is that polycaproamide is ordinarily thoroughly washed with hot water in the course of its preparation to reduce the content therein of water extractible constituents (monomer and low polymers) from about 10–12% down to a level not above 5% by weight, preferably not above 2% by weight. Such extensive water washing and the drying of the resulting polymer, it has been found, tends to produce coloration in polycaproamide in presence of copper compounds and tends to remove the further additives, whereby only the heat stabilization due to copper is obtained in the final product. Moreover with some of the additives such as reducing acids, the polymer melt is apt to become highly colored; furthermore acids may induce gelling in the polymer melt and/or may stabilize the polymer viscosity so that only comparatively low molecular weight polymer can be obtained. Aqueous treatment of other polyamides in yarn form, e.g. scouring or bleaching, may result in similar difficulties.

In accordance with the present invention, we obtain a greatly enhanced heat stabilization of polymeric amide having recurring amide groups as an integral part of the main polymer chain and capable of being formed into a filament, said polymeric amide being stabilized against heat by incorporation therein of copper, which enhancement is retained after exhaustive water washing, the polymeric amide thus stabilized being resistant to scouring and bleaching. Moreover we can obtain polymer of desirably high molecular weight and polymer of practically pure white color without defects due to gelation of the polymer. In the discussion below, polycaproamide is particularly mentioned but it will be understood that like procedures can be applied with generally similar results to stabilize other polyamides such as specifically polyundecanoamide, polyhexamethylene adipamide, polyhexamethylene sebacamide, poly-m- or p-xylylene adipamide, etc.

Our invention involves a polymeric amide composition stabilized against heat by incorporation therein of copper, to which composition a stannous salt, especially and preferably stannous iodide, has been added in amounts preferably between about 0.001 part and about 2 parts per 100 parts by weight of the polymeric amide. More particularly our invention involves poly-epsilon-caproamide compositions, especially those containing not over 5% by weight of water extractible constituents wherein the copper is introduced in a form soluble in molten ε-caprolactam monomer and is in amounts between about 0.001 part and about 0.03 part as copper per 100 parts by weight of the polycaproamide; and wherein stannous iodide is added in amounts between about 0.01 part and about 1 part by weight per 100 parts by weight of the polycaproamide whereby a polycaproamide is obtained having excellent heat stability and substantially the white color of polycaproamide free of additives. The heat stability of the compositions of our invention is generally at least about double and often will be many fold that of the same polycaproamide heat stabilized by the same amount of copper compound alone, or by the same amount of stannous salt alone.

In our compositions, copper can be incorporated in any form used heretofore for heat stabilization, e.g. by adding to the polymerization reaction mixture at any stage of the polymerization a cuprous or cupric salt of an organic or inorganic acid such as a cuprous or cupric chloride, iodide, bromide, fluoride, sulfate, nitrate, phosphate, sulfide, ferrocyanide, sulfocyanide, cyanide, carbonate or complex chloride of copper and ammonium. Finely divided copper metal or finely divided copper oxide can also be used; these apparently form compatible compounds of some kind with the polycaproamide. Organic acid salts of copper which can be used include cuprous or cupric acetate, propionate, butyrate, laurate, palmitate, stearate, formate, benzoate, naphthenate, lactate, and salicylate, the above being exemplary of copper compounds that can be used but not an exhaustive listing. We have found that cupric acetate is particularly suitable since the acetate ion is non-corrosive to e.g. stainless steel and has little tendency to cause polymer discoloration or gelation at elevated temperatures.

Stannous iodide is our preferred stannous salt in particular because of its unique characteristic of leading to very white polymer product. Other stannous salts, we have found, co-act with copper in polycaproamide to impart greatly improved heat stability, for example inorganic salts such as stannous chloride, bromide and sulfate, and organic salts such as stannous acetate and tartrate. Thus these and like stannous salts can be used to obtain some of the advantages of our invention.

As a matter of convenience and economy we prefer to incorporate the copper and the stannous salt in the polycaproamide by adding these ingredients to the monomeric polymerization reaction mixture; but it is also possible to add these ingredients at any stage of polymerization or to add them to the finished polymer by blending with a melt thereof or by uniformly coating pellets or granules of the polymer with these ingredients e.g. in powder form, and melt extruding the coated pellets to form a blend. In general the stannous salts are readily soluble, in the amounts employed in our invention, in molten ε-caprolactam monomer; and we prefer to use copper in the form of a compound likewise soluble in the molten monomer, e.g. acetate, chloride, etc.

The following examples describe completely specific embodiments of the present invention, illustrative of the best mode contemplated by us of carrying out the present invention, but are not to be interpreted as limiting the scope of the invention to all details of the examples.

*Example 1*

Molten ε-caprolactam at about 85° C. containing about 1 part of water per 100 parts by weight of the caprolactam, and having dissolved therein about 0.013 part of cupric chloride and about 0.14 part of stannous iodide per 100 parts by weight of the ε-caprolactam, was heated in a glass resin flask equipped with electric heating mantle, type 316 stainless steel horseshoe agitator, thermocouple, inert gas inlet and outlet, condenser, and bubbler tube. The flask had been purged with dry inert gas (nitrogen-carbon dioxide mixture) containing less than 5 parts per million of oxygen. Under a sweep of inert gas at back pressure of one inch of water, the reactor was heated in one hour to about 195° C. and in 3 hours more to about 255° C.; and the temperature of 255° C. was maintained for about 13 hours. Water and a small amount of caprolactam distilled off.

The resulting molten polymer was extruded from an orifice in the bottom of the reactor under an atmosphere of inert gas with a pressure of 4 inches of water above atmospheric, into a water quenching path. A solidified rod of polymer was thus obtained which was cut into cylindrical pellets of length and diameter about 1/10 inch. These pellets were washed 4 times with distilled water at 100° C. for 2 hours in each wash; then were dried at 90° C. under inert gas for at least about 24 hours, until the moisture content was not above 0.2% by weight. The resulting polymer contained not above 2% by weight of water extractible constituents and was of excellent white color, susbtantially the same as that of polycaproamide similarly prepared using only water as additive. The polymer of this example was of medium molecular weight, i.e. the relative viscosity measured at 25° C. per ASTM Test D–789–53T on a solution of 11 grams of polymer per 100 ml. of aqueous 90% formic acid is in the range 40–70, corresponding to reduced viscosities in meta-cresol at 25° C. and 0.5% concentration of about 1.3–1.9 deciliters per grams.

Specimens for microtensile tests in accordance with the procedures of the American Society for Testing Materials were molded from the polycaproamide product in a conventional injection molding machine. These test specimens were placed in an air-circulating oven at 160° C. and were periodically tested by standard ASTM tests for impact strength, ultimate tensile strength, and ultimate elongation. It was observed that these properties all showed a sharp decrease at about the same time, which time was taken as the time to failure.

A control polycaproamide prepared as in this example but using only water as additive showed a time to failure of much less than one day in the above tests; control polycaproamides prepared as in this example but using only the cupric chloride additive (0.013 part and also 0.026 part per 100 parts by weight of caprolactam) each showed time to failure in the above tests of 6 days, and showed a distinct coloration. Control polycaproamides prepared as in this example but using only the stannous iodide additive (0.14 part and also 0.28 part per 100 parts by weight of caprolactam) each showed time to failure of about 1 day.

The polycaproamide of this example, containing both the cupric chloride additive and the stannous iodide additive showed by contrast a time to failure of about 30 days in the above test.

Doubling the quantities of cupric chloride and stannous iodide in otherwise the procedure of this example gave similar results to those of this example.

*Example 2*

When cupric acetate monohydrate is substituted for cupric chloride using otherwise the same procedure as in Example 1, in amount of about 0.19 part per 100 parts by weight of caprolactam i.e. about the same amount of copper as in Example 1, namely about 0.006 part per 100 parts of 60 p.p.m. by weight of caprolactam substantially the same heat stability is obtained as in Example 1 measured by time to failure in tests as in Example 1. Use of cupric acetate has the advantage of being less troublesome than cupric chloride in that the cupric acetate is non-corrosive to stainless steel equipment and allows greater latitude in heating the polymer without causing gelation.

*Example 3*

A polycaproamide was prepared by essentially the procedure of Example 1 but using about 0.11 part of cupric chloride per 100 parts by weight of caprolactam, corresponding to 0.005 part of copper per 100 parts or 50 p.p.m. by weight of carolactam; and using 0.2 part of stannous iodide per 100 parts by weight of caprolactam. The heat stability of this composition as measured by time to failure is similar to that of the compositions of Examples 1 and 2. The whiteness of the composition of Example 3 was measured by the "Color-Eye" manufactured by Instruments Development Laboratories, Inc., Boston, Mass.

In this instrument an amber filter, a blue filter and a green filter are inserted successively and the 3 readings (A, B, G) obtained with each upon the sample are used to determine yellowness index of the sample (Y.I.) employing the formula $$Y.I. = \frac{A-B}{G} \times 100 + 100$$

Y.I. values above 100 correspond to yellowness; e.g. about 110 represents a distinct yellow cast; a sample with Y.I. of 105 is just faintly yellow; and values near 100 mean colorless. Values below 100 correspond to bluish tints.

The Y.I. of this polycaproamide was 102 which was substantially the same as obtained upon a polycaproamide having only titanium dioxide as additive therein (0.02% by weight giving off-bright yarn and 0.3% by weight giving a semidull yarn).

A polycaproamide sample prepared by the same procedure as used in this Example 3 except omitting stannous iodide contained about 50 parts per million of copper added as cupric chloride, and showed a Y.I. of 116 which represents a distinct yellow coloration.

Use in the same general manner as in the above examples of other stannous salts instead of stannous iodide together with copper, e.g. stannous chloride, sulfate or tartrate, also confers execllent improvement in heat stability over copper alone but tends to give polycaproamide with a yellowish cast, we have observed. Accordingly we have found a particular and unexpected advantage of using stannous iodide together with copper is the excellent white color of the polyamide obtainable thereby.

We have observed that the caprolactam solutions containing our copper compound and stannous iodide are colored before polymerization, but as the polymerization proceeds the color fades to practically white, indicating some kind of interaction; however we have not at this time determined the detailed mechanism responsible for the remarkable effects of our additives upon heat stability and color of ε-polycaproamide.

In tests of our compositions with typical bleaching and scouring agents we have found our compositions are stable, resisting degradation and discoloration by these agents.

The luster of yarn obtained from polycaproamide of this Example 3 was measured by directing a beam of light at a yarn sample at a 45° angle and measuring the intensity of 2 reflected beams, one being at a reflection angle of 45°—i.e. the mirror reflection angle—and the second being at any convenient angle such as 90°. Percent luster is determined by comparing the intensities of the 2 beams, 100% luster corresponding to finding all the reflected light in the 45° angle reflection and 0% luster corresponding to finding equal intensities of light in the 45° direction and in the arbitrary direction. The luster thus found for the sample of this polycaproamide of Example 3 was 97.4% which is in the same range of 97–98% found for polycaproamides containing no additives; and compares to 94% for the above cited similarly prepared off-bright polycaproamide yarn containing 0.02% by weight of titanium dioxide, and compares to 71% for the above cited semidull polycaproamide yarn containing 0.3% by weight of titanium dioxide.

The following is a specific example of use of another stannous salt instead of the iodide and use of a relatively complex copper compound to form a composition of our invention.

*Example 4*

To 2000 parts by weight of ε-caprolactam and 10 parts of water melted in a glass vessel at 85° C. was added 1.28 parts of cupric salicylate tetrahydrate dissolved in 5 parts of water (about 100 parts as copper per million parts by weight of caprolactam) followed by 0.32 part of stannous chloride dissolved in 5 parts of water (100 p.p.m. as tin).

This mixture was polymerized and the resulting polymer was washed and dried as in Example 1 above.

Test specimens molded as with product of Example 1 were placed in an air-circulating oven at 120° C. Specimens were periodically removed and tested for impact strength and tensile properties as in Example 1. The time to failure thus determined was 90 adys, whereas a similar polycaproamide composition containing only copper compound as additive, and no stannous salt, had time to failure in the same test (120° C.) of 45 days.

*Example 5*

Stannous tartrate tested together with cupric salicylate by essentially the procedure of the above Example 4, except at a tin content in the polycaproamide of about 40 p.p.m., gave essentially the same results as the stannous chloride of Example 4.

*Example 6*

Stannous sulfate (100 p.p.m. as tin) tested together with cupric chloride by essentially the procedure of the above Example 4, except at copper content in the polycaproamide of about 60 p.p.m., gave time to failure of more than 90 days in the tests of Example 4 at 120° C.

Polymers produced as in the above examples can readily be brought to medium and high levels of molecular weight corresponding to relative viscosities in formic acid of 40–70 as measured by the standard ASTM procedure. The viscosity reached depends upon the rate of flow of the inert sweep gas and the time during which the polymer is held at the polymerization temperature of 255° C. Still higher viscosities can be reached by applying more drastic conditions for removal of water from the polymer.

The polycaproamide products of this invention are particularly useful in production of natural color, heat stable molding resin and in production of bright, white, heat stable filaments and yarn. The products show stability to degradation by light, at least in absence of titanium dioxide pigment in the product. They are also resistant to degradation by bleaching and scouring treatments, by contrast to compositions containing only a copper salt additive.

We claim:

1. A heat stabilized composition of a polymeric amide having recurring amide groups as an integral part of the main polymer chain and capable of being formed into a filament, wherein the polymeric amide is poly-ε-caproamide; the copper is in a form soluble in molten ε-caprolactam monomer and is in amounts between about 0.001 part and about 0.03 part as copper per 100 parts by weight of the polycaproamide; and the stannous salt is in amounts between about 0.001 part and about 2 parts per 100 parts by weight of the polycaproamide.

2. Composition of claim 1 wherein the polycaproamide contains not over 5% by weight of water extractible constituents; wherein said copper is incorporated in the polycaproamide in the form of cupric acetate; and wherein the stannous salt is stannous iodide in amounts between about 0.01 part and about 1 part per 100 parts by weight of the polycaproamide.

3. Process for producing poly-ε-caproamide stabilized against heat, comprising forming an ε-caprolactam polymerization reaction mixture containing, per 100 parts by weight of caprolactam, dissolved copper compound in amounts between about 0.001 part and about 0.03 part as copper and dissolved stannous salt in amounts between about 0.001 part and about 2 parts; and polymerizing the ε-caprolactam in said reaction mixture.

References Cited by the Examiner

UNITED STATES PATENTS

| | | | |
|---|---|---|---|
| 2,960,489 | 11/1960 | Gabler et al. | 260—45.75 |
| 3,067,168 | 12/1962 | Purdon et al. | 260—45.75 |
| 3,189,575 | 6/1965 | Horn et al. | 260—45.75 |

LEON J. BERCOVITZ, *Primary Examiner.*

G. W. RAUCHFUSS, *Assistant Examiner.*